Sept. 22, 1925.
G. DEMMER
STALK CUTTER
Filed Dec. 6, 1923
1,554,716
2 Sheets-Sheet 1
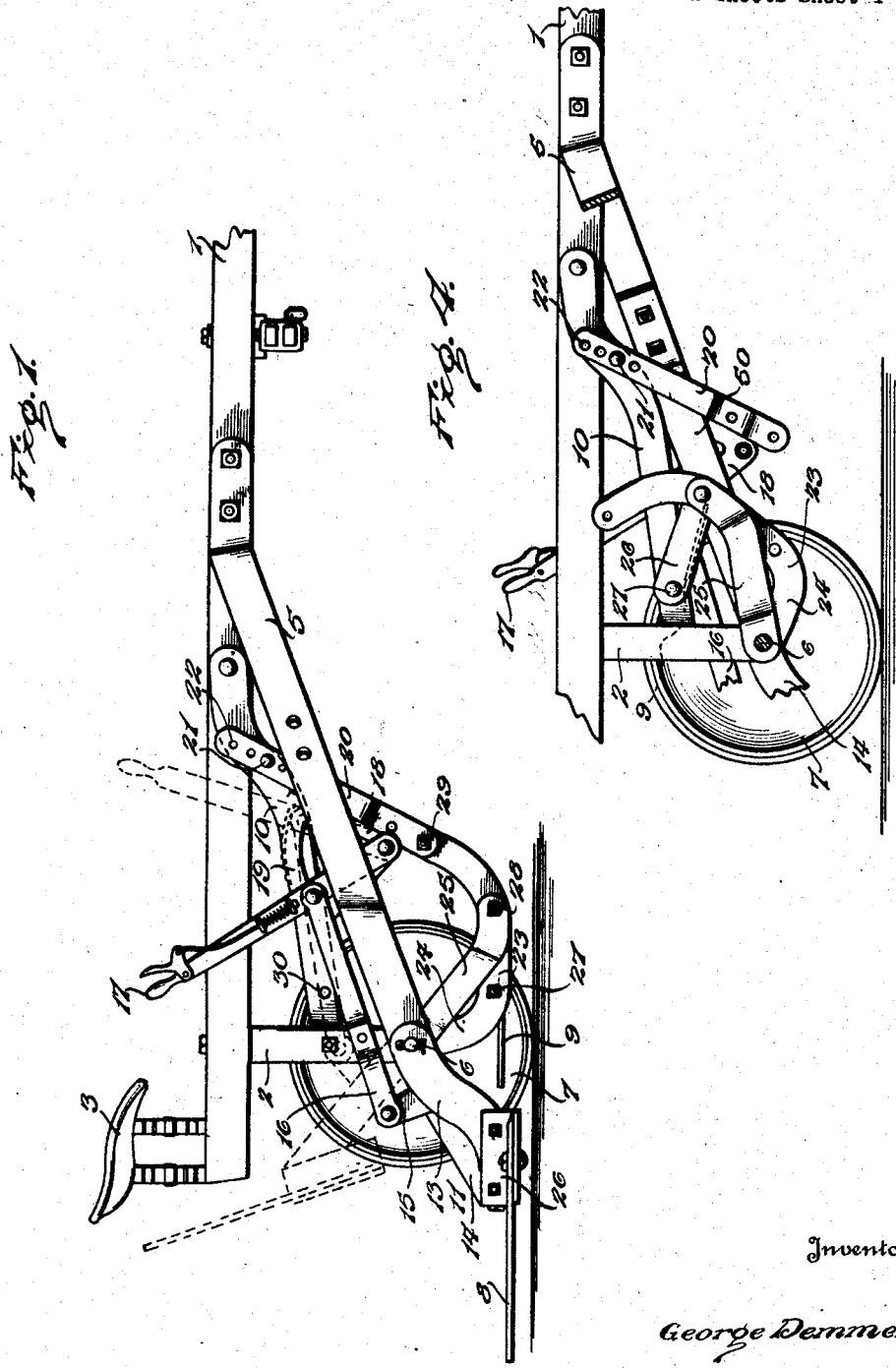
Inventor
George Demmer
By
Lacy & Lacy Attorneys

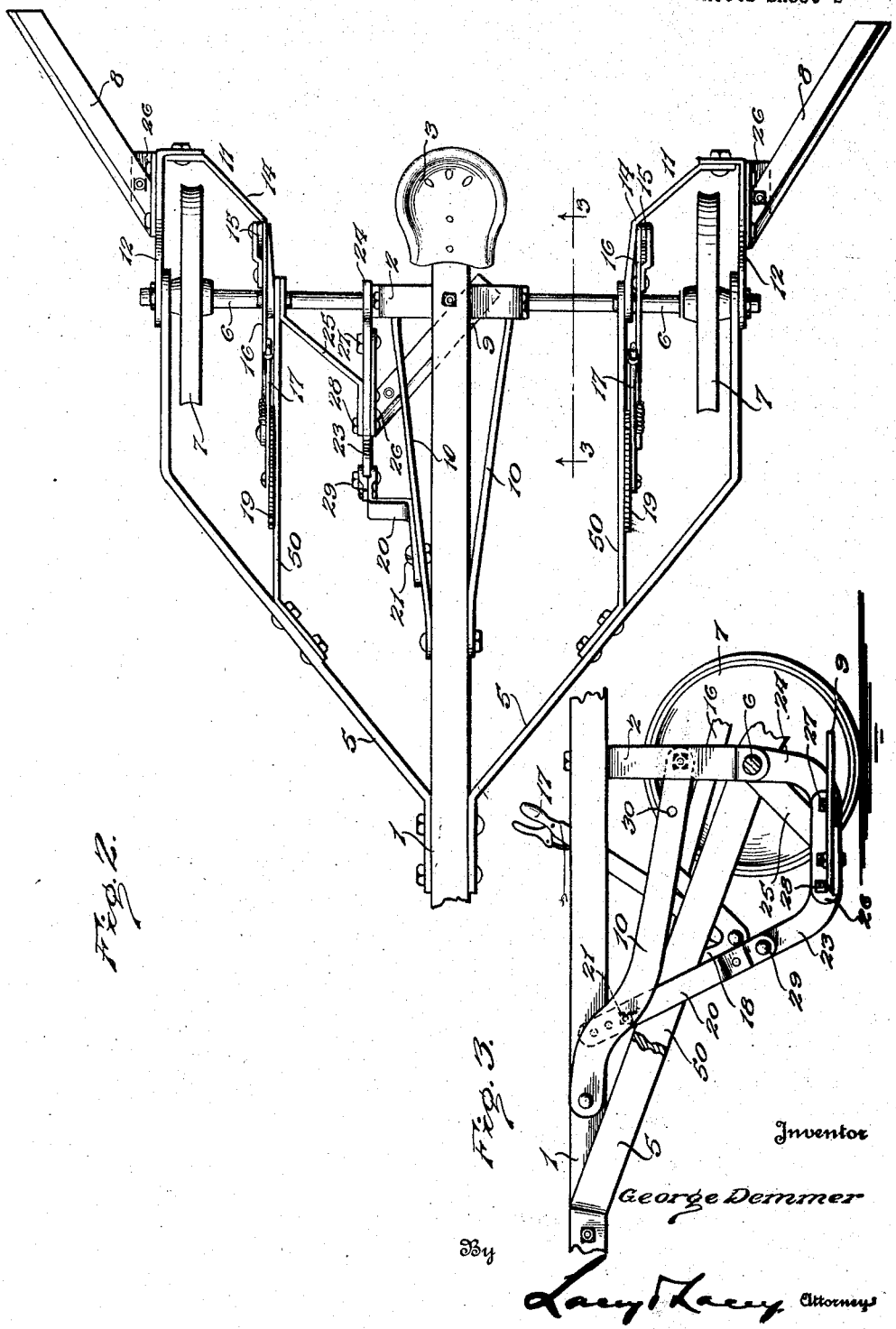

Patented Sept. 22, 1925.

1,554,716

UNITED STATES PATENT OFFICE.

GEORGE DEMMER, OF HERNDON, KANSAS.

STALK CUTTER.

Application filed December 6, 1923. Serial No. 678,930.

*To all whom it may concern:*

Be it known that I, GEORGE DEMMER, a citizen of the United States, residing at Herndon, in the county of Rawlins and State of Kansas, have invented certain new and useful Improvements in Stalk Cutters, of which the following is a specification.

This invention relates to agricultural implements and has for its object the provision of means which may be readily attached to a wheeled frame and operated to cut stubble as the implement is drawn over a field. The invention is intended more particularly for cutting the stubble of corn stalks and is designed to cut three rows simultaneously but it is, of course, capable of use for cutting any stems or stalks which may be left standing after a harvest. The invention seeks to provide an implement which will be inexpensive and simple in its construction and in which the cutters may be readily lifted to an inoperative position when it is desired to transfer the implement from one field to another field. The invention is illustrated in the accompanying drawing and will be hereinafter fully set forth.

In the drawing:

Figure 1 is a side elevation of an implement having my invention applied thereto, the near wheel being removed;

Fig. 2 is a plan view;

Fig. 3 is a section on the line 3—3, Fig. 2, more particularly showing the mounting of the middle knife, and Fig. 4 is a similar view looking in the opposite direction and showing the knife raised.

The frame comprises a tongue 1 carrying a seat 3 and having its rear end secured to a fixed axle consisting of a central arched portion 2 and horizontal spindles 6 projecting outwardly from the ends of said arched portion. Draft devices are mounted upon the tongue and braces 5 are secured to the tongue and extend outwardly and rearwardly therefrom to the outer ends of the spindles 6 upon which the wheels 7 are mounted. In carrying out my invention, I provide two knives 8 which are located at the sides of the frame and diverge rearwardly therefrom. I also provide a center knife 9 which is disposed at the center of the frame and is carried by elements suspended on one spindle 6 and a brace 10 which extends between the tongue and a side of the arch 2. It will thus be seen that three rows of stalks may be cut through at one time, the wheels 7 running in the furrows at the sides of the center row in an obvious manner. Each knife 8 is secured rigidly to a hanger frame 11 which is substantially U-shaped in plan view so as to pass around and in rear of the adjacent wheel 7. Each of said frames comprises an outer angular bar 12 having a lower portion to which the inner end of the adjacent blade 8 is rigidly secured and an upstanding portion 13 which rises from the front end of the said lower portion and is pivotally engaged upon the outer end of the adjacent spindle 6 (see Figs. 1 and 2). The hanger frame is completed by the inner bar 14 which extends upwardly and forwardly from the rear end of the member 12 and has its upper front end also pivotally engaged upon the same spindle 6. Formed upon or rigidly secured to each member 14 is a post or upwardly extending arm 15, and a link 16 extends forwardly from the upper end of said arm to a hand lever 17 which is fulcrumed upon a bracket 18 carried by the brace 50 and equipped with the usual latch cooperating with a segment 19 forming the upper portion of the bracket 18. When the device is in use, the hand lever is thrown rearwardly, as shown in full lines in Fig. 1, so that the blade will be lowered and will be drawn against and through the upstanding stalks. When the implement is to be carried over a road or is to be moved into a barn, the hand lever is thrown forwardly, as indicated by the dotted lines in Fig. 1, whereupon the hanger frame 11 will be swung upwardly and forwardly about the spindle 6 as a pivot and the knife caused to assume an upright position.

The center knife 9 is carried by a frame comprising a link 20 which is secured at its upper end to the brace 10 by a bolt 21 inserted through said brace and one of the openings 22 in the link so that the knife may be set to cut in a higher or lower plane. The lower end of this link is connected to the upturned front end of a hanger 23 which has an upturned rear end, shown at 24, which, in turn, is pivotally mounted upon a spindle 6 immediately adjacent the lower end of one side of the arch. A brace 25 is secured at its lower front end to the hanger 23 and is pivotally mounted at its upper rear end upon the spindle 6 adjacent the brace 50. The knife 9 is secured rigidly to a bracket 26 which, in turn, is secured to the inner side of the hanger 23, a bolt 27 fastening the rear end of the bracket and a bolt 28 fastening the front end of the bracket, said bolt 28 also fastening the brace 25 to the hanger. A bolt 29 detachably secures the front end of the hanger to the lower end of the link 20. When the device is in use, the knife 9 and the parts carrying the same are in the position shown in Fig. 1. If the knife is to be raised, the bolt 29 is removed, the bolt 28 slightly loosened, and the bolt 27 removed. The bracket 26 is then swung upwardly into the position shown in Fig. 4, the hanger 23 and the brace 25 swinging pivotally upon the spindle 6 and the link 20 hanging free on the tongue or the brace 10 and the rear end of the bracket 26 moving pivotally upon the bolt 28. The bolt 27 is then re-inserted through the rear end of the bracket 26 and inserted through an opening 30 in the frame bar or brace 10 to secure the bracket 26 to said brace, whereupon the knife will be held firmly in the raised position with the hanger 23 extending upwardly past the brace and the machine may be driven into another field. When the knife is to be again used, it is, of course, restored to the position shown in Figs. 1 and 3.

Each knife is secured to an angle bracket, such as indicated at 26, and the angle bracket is secured to the side of the respective hanger.

Having thus described the invention, I claim:

1. The combination with a wheeled frame including a tongue, a wheel-carrying spindle and a brace between the tongue and the spindle, of a link attached to and depending from the brace, a hanger pivotally mounted at its rear end on the spindle and detachably connected at its front end to the link, a knife-carrying bracket disposed against the side of the hanger and permanently attached thereto at one end, and a detachable fastening device to secure the opposite end of the bracket to the hanger or to the brace.

2. The combination with a main frame including a tongue, a wheel-carrying spindle and a brace between the tongue and the spindle, of a link suspended near the front end of the brace, a hanger pivotally mounted at its rear end upon the spindle, a knife carried by the hanger, a detachable connection between the front end of the hanger and the link to carry the knife in a lowered operative position, and means whereby the hanger may be connected with the brace to carry the knife in a raised inoperative position.

In testimony whereof I affix my signature.

GEORGE DEMMER. [L. S.]